(12) United States Patent
Fukuo et al.

(10) Patent No.: US 8,807,303 B2
(45) Date of Patent: Aug. 19, 2014

(54) SHOCK ABSORBING MEMBER AND SHOCK ABSORBING STRUCTURE

(75) Inventors: Michihiro Fukuo, Toyota (JP); Takahiro Hasegawa, Toyota (JP)

(73) Assignee: Nifco Inc., Yokohama-shi (JP)

( * ) Notice: Subject to any disclaimer, the term of this patent is extended or adjusted under 35 U.S.C. 154(b) by 249 days.

(21) Appl. No.: 13/384,107

(22) PCT Filed: Jul. 15, 2010

(86) PCT No.: PCT/JP2010/062009
§ 371 (c)(1),
(2), (4) Date: Feb. 23, 2012

(87) PCT Pub. No.: WO2011/007844
PCT Pub. Date: Jan. 20, 2011

(65) Prior Publication Data
US 2012/0152674 A1    Jun. 21, 2012

(30) Foreign Application Priority Data
Jul. 15, 2009    (JP) .................... 2009-166824

(51) Int. Cl.
*F16F 7/12*    (2006.01)

(52) U.S. Cl.
USPC ........................................ 188/377

(58) Field of Classification Search
USPC .................. 188/371, 377; 296/146.6, 146.7
See application file for complete search history.

(56) References Cited

U.S. PATENT DOCUMENTS

| | | | |
|---|---|---|---|
| 6,682,128 B2 * | 1/2004 | Carroll et al. | ............ 296/187.03 |
| 7,934,587 B2 * | 5/2011 | Thenier et al. | ................ 188/371 |
| 8,474,583 B2 * | 7/2013 | Nagwanshi et al. | .......... 188/371 |
| 2001/0017476 A1 | 8/2001 | Nishikawa et al. | |
| 2002/0007598 A1 | 1/2002 | Nishikawa et al. | |

FOREIGN PATENT DOCUMENTS

| | | |
|---|---|---|
| EP | 1 129 873 A2 | 9/2001 |
| JP | 08-066981 | 3/1996 |
| JP | H08-188052 | 7/1996 |
| JP | 08-276807 | 10/1996 |
| JP | 08-295194 | 11/1996 |
| JP | 09-011829 | 1/1997 |
| JP | H09-048301 | 2/1997 |
| JP | H09-071200 | 3/1997 |

OTHER PUBLICATIONS

European Patent Office, "Supplementary European Search Report for EP 10 79 9902", Nov. 12, 2012.
Japanese Patent Office, "Office Action for JP2009-166824", Nov. 27, 2012.

* cited by examiner

*Primary Examiner* — Melanie Torres Williams
(74) *Attorney, Agent, or Firm* — Manabu Kanesaka

(57) ABSTRACT

A second shock absorbing portion (18) includes an encirclement wall (42) and ribs (46) which are formed to have a height greater than that of an encirclement wall (40) and ribs (44) in a first shock absorbing portion (20). The ribs (44) and the ribs (46) have substantially the same wall thickness, and the number of the ribs (44) is the same as the number of the ribs (46). Accordingly, the second shock absorbing portion (18) is more brittle than the first shock absorbing portion (20), since the second shock absorbing portion (18) is made to have a height greater than that of the first shock absorbing portion (20). Further, the first shock absorbing portion (20) is placed in a vehicle inner side, while the second shock absorbing portion (18) is placed in a vehicle outer side.

10 Claims, 7 Drawing Sheets

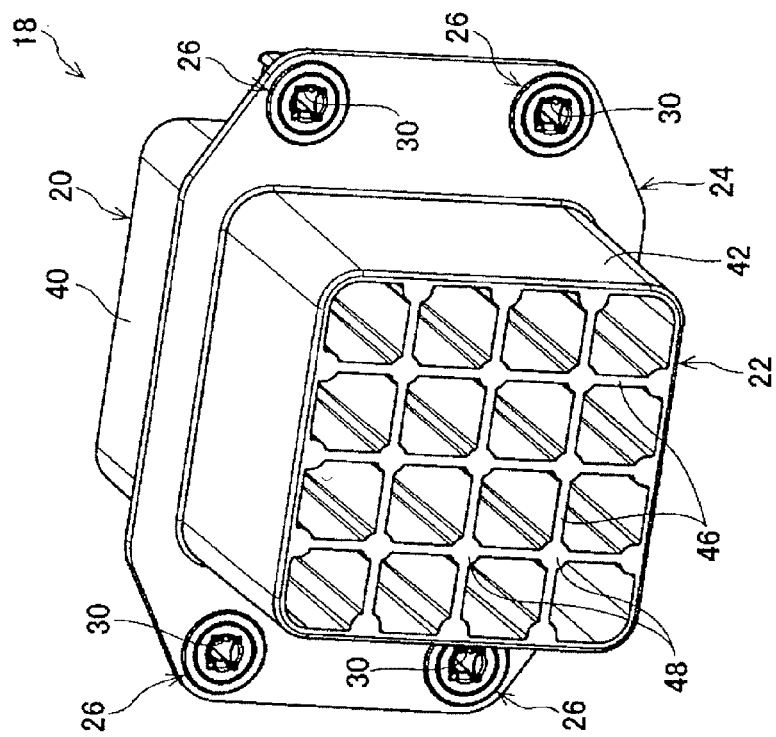
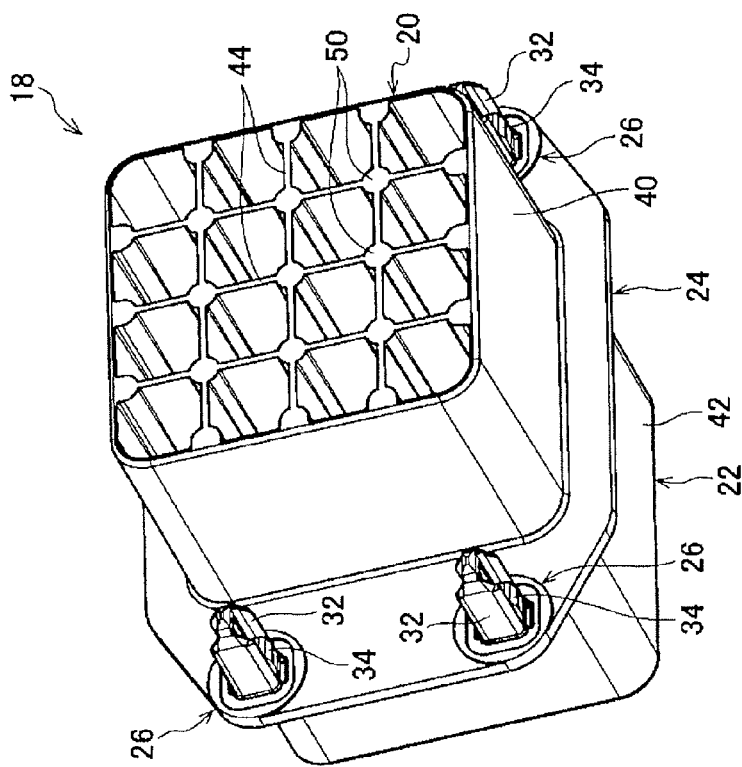

SHOCK ABSORBING MEMBER AND SHOCK ABSORBING STRUCTURE

RELATED APPLICATIONS

The present application is National Phase of International Application No. PCT/JP2010/062009 filed Jul. 15, 2010, and claims priority from Japanese Application No. 2009-166824, filed Jul. 15, 2009.

TECHNICAL FIELD

The present invention relates to a shock absorbing member to be mounted in a door panel member, and a shock absorbing structure for the door panel member.

BACKGROUND ART

Vehicles, particularly automobiles, are provided with shock absorbing members for absorbing shocks from outside of the vehicle bodies, against impacts exerted on the vehicle-body side surfaces, so-called side impacts.

For example, Patent Document 1 describes securing a shock absorbing member to a door panel member provided between a door outer panel and a door inner panel such that the shock absorbing member protrudes toward the door outer panel and the door inner panel, and further, providing a brittle portion in the shock absorbing member at its boundary portion between the shock absorbing member and the door panel member, in order to cause the shock absorbing member to break from its brittle portion in the event of impacts exerted on the side surfaces of the vehicle body.

Further, Patent Document 2 describes provision of a shock absorbing member in a vehicle-body front side with respect to a dash panel. This shock absorbing member is structured to include hollow portions extending in the forward and rearward directions of the vehicle body, such that these hollow portions are longitudinally and laterally partitioned by plural partition walls intersecting with each other. Further, Patent Document 3 describes forming a tubular-shaped outer wall portion interposed between a door trim and a door panel, such that the internal space within the outer wall portion is partitioned by plural ribs.

PRIOR ART DOCUMENTS

Patent Documents

Patent Document 1: Japanese Patent No. 3873565
Patent Document 2: JP-A No. 2009-51251
Patent Document 3: Japanese Patent No. 3575096

SUMMARY OF THE INVENTION

Problems to be Solved by the Invention

In view of the aforementioned circumstances, the object of the present invention is to provide a shock absorbing member and a vehicle-body-panel shock absorbing structure which are capable of effectively absorbing shocks from outside of a vehicle body.

Means for Solving the Problems

In a first aspect of the present invention, there is provided a shock absorbing member which is mounted in a door panel member and is adapted to absorb shocks from outside of a vehicle, and the shock absorbing member includes a mounting plate mounted in the door panel member; a first shock absorbing portion which is provided on one surface of the mounting plate and is positioned in a vehicle inner side with respect to the door panel member; and a second shock absorbing portion which is provided on the other surface of the mounting plate, has a higher shock absorbing ability than that of the first shock absorbing portion and is positioned in a vehicle outer side with respect to the door panel member. The first shock absorbing portion includes a plurality of first ribs with the same height which is erected from the mounting plate, and a first encirclement wall which is erected from the mounting plate, encircling the plurality of first ribs and has the same height as that of the first ribs. The second shock absorbing portion includes a plurality of second ribs with the same height which is erected from the mounting plate, and a second encirclement wall which is erected from the mounting plate, encircles the plurality of second ribs and has the same height as that of the second ribs.

In the aforementioned aspect, the shock absorbing member is provided with the mounting plate which is mounted in the door panel member, and the first shock absorbing portion is formed on one surface of the mounting plate, while the second shock member is formed on the other surface of the mounting plate. This second shock absorbing portion is made to have a higher shock absorbing ability than that of the first shock absorbing portion.

Namely, there are provided different shock absorbing abilities, in one surface side and in the other-surface side. Further, the first shock absorbing portion is placed in the vehicle inner side while the second shock absorbing portion is placed in the vehicle outer side, in order to provide a higher shock absorbing ability in the vehicle outer side than that in the vehicle inner side, for alleviating impulsive forces exerted on the vehicle inner side.

In this case, the first shock absorbing portion includes the plurality of first ribs erected therein and the first encirclement wall encircling the plurality of first ribs. The first encirclement wall and the plurality of first ribs all have the same height. Further, the second shock absorbing portion includes the plurality of second ribs erected therein and the second encirclement wall encircling the plurality of second ribs. The second encirclement wall and the plurality of second ribs all have the same height.

In cases where the first shock absorbing portion does not have a constant height at its end surface and if an impulsive force from the outside is transmitted to the first shock absorbing portion, a portion of the first shock absorbing portion receives the impulsive force transmitted thereto from the outside, and the impulsive force is transmitted from the portion of the first shock absorbing portion to the door panel member through the mounting plate. Namely, the first shock absorbing portion is caused to have portions which can not absorb impulsive energy, thereby resulting in poor effectiveness.

However, the first shock absorbing portion and the second shock absorbing portion are made to have respective constant heights at their end surfaces; therefore, the first shock absorbing portion and the second shock absorbing portion at their entire surfaces can receive impulsive forces transmitted thereto from the outside, and thus, can effectively absorb the impulsive energy.

In a second aspect of the present invention, in the first aspect of the present invention, the plurality of first ribs and the plurality of second ribs can be arranged in respective lattice shapes.

With the aforementioned structure, the plurality of first ribs and the plurality of second ribs are arranged in respective lattice shapes. Namely, the plurality of first ribs or the plurality of second ribs is coupled to each other, so that impulsive forces transmitted to the first shock absorbing portion and the second shock absorbing portion can be received by all the plurality of first ribs or all the plurality of second ribs, while being dispersed longitudinally and laterally. Thus, this impulsive force can be effectively absorbed.

In a third aspect of the present invention, in the first aspect of the present invention, the second ribs can be formed to have a larger length than that of the first ribs.

With the aforementioned structure, the second ribs are formed to have a larger length than that of the first ribs, so that the second ribs have a lower strength than that of the first ribs, and the second shock absorbing portion is made to have a higher shock absorbing ability than that of the first shock absorbing portion.

In a fourth aspect of the present invention, in the first aspect of the present invention, the second ribs can be formed to have a smaller wall thickness than that of the first ribs.

With the aforementioned structure, the second ribs are formed to have a smaller wall thickness than that of the first ribs, so that the second ribs have a lower strength than that of the first ribs, and the second shock absorbing portion is made to have a higher shock absorbing ability than that of the first shock absorbing portion.

In a fifth aspect of the present invention, in the first aspect of the present invention, the number of the second ribs can be smaller than the number of the first ribs.

With the aforementioned structure, the number of the second ribs is made smaller than the number of the first ribs, so that the second ribs have a lower strength than that of the first ribs, and the second shock absorbing portion is made to have a higher shock absorbing ability than that of the first shock absorbing portion.

In a sixth aspect of the present invention, in the first aspect of the present invention, at least the first ribs or the second ribs can have a wall thickness varying in a stepwise manner or in a gradual manner, from their tip end portions to their root portions.

With the aforementioned structure, at least the first ribs or the second ribs have a wall thickness varying in a stepwise manner or in a gradual manner, from their tip end portions to their root portions, which can vary their shock absorbing abilities in a stepwise manner or in a gradual manner.

In a seventh aspect of the present invention, there is provided a shock absorbing structure for absorbing shocks from outside of a vehicle, including: the shock absorbing member in the first aspect of the present invention; wherein the first shock absorbing portion can be inserted in a mounting hole formed in the door panel member, from a vehicle outer side, the first shock absorbing portion can be placed in a vehicle inner side with respect to the door panel member, the second shock absorbing portion can be placed in a vehicle outer side with respect to the door panel member, and the mounting plate can be mounted to a portion of the door panel member around the mounting hole.

With the aforementioned structure, the first shock absorbing portion is inserted in the mounting hole formed in the door panel member, the first shock absorbing portion is placed in the vehicle inner side with respect to the door panel member, while the second shock absorbing portion is placed in the vehicle outer side with respect to the door panel member, in order to provide, in the vehicle outer side, a higher shock absorbing ability than that in the vehicle inner side, for alleviating impulsive forces exerted on the vehicle inner side.

Effects of the Invention

According to the present invention, there are provided the aforementioned structures, which enable effectively absorbing shocks from the outside of the vehicle body.

BRIEF DESCRIPTION OF THE DRAWINGS

FIG. 1A is a perspective view illustrating a shock absorbing member according to the present embodiment, which is viewed from a second shock absorbing portion.

FIG. 1B is a perspective view illustrating the shock absorbing member according to the present embodiment, which is viewed from a first shock absorbing portion.

EMBODIMENTS OF THE INVENTION

Hereinafter, a shock absorbing member according to the present embodiment will be described, with reference to the drawings.

Figure 5A:
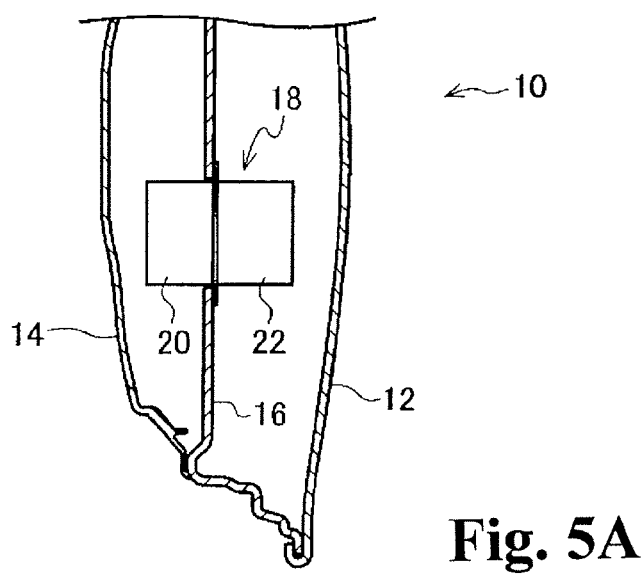
FIG. 5A is a cross-sectional view of a side door in which the shock absorbing member according to the present embodiment is mounted, in a state before the shock absorbing member experiences a shock.
Figure 6:
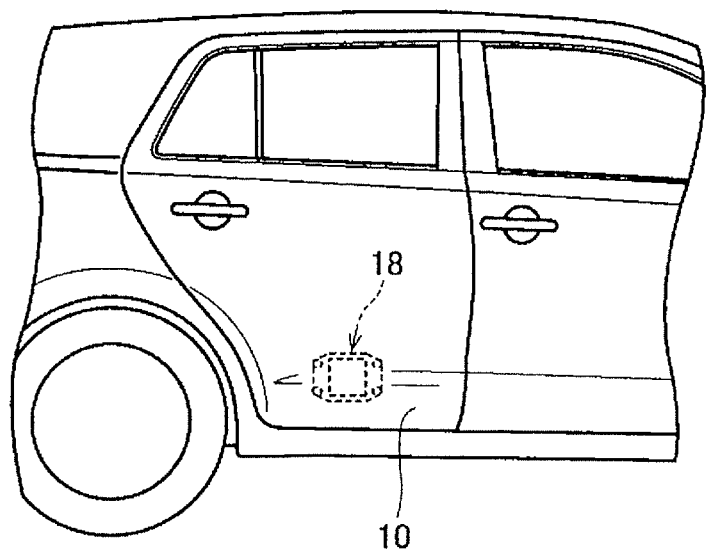
FIG. 6 is a side view of the side door in which the shock absorbing member according to the present embodiment is mounted.

As illustrated in FIG. 5A and FIG. 6, a side door (vehicle body) 10 provided in a vehicle-body side portion includes an outer panel 12 provided in a vehicle outer side of the side door 10, and an inner panel 14 provided in a vehicle inner side thereof, wherein a door panel member 16 is provided between the outer panel 12 and the inner panel 14. The door panel member 16, the outer panel 12 and the inner panel 14 are secured to each other by welding and the like, and a shock absorbing member 18 is mounted in the door panel member 16 at a position aligning with a seat bottom portion, which is not illustrated.

(Structure of Shock Absorbing Member)

Hereinafter, with reference to FIGS. 1 to 4, the structure of the shock absorbing member 18 will be described.

As illustrated in FIG. 1A and FIG. 1B, the shock absorbing member 18 includes a first shock absorbing portion 20 having an angular shape, and a second shock absorbing portion 22 having an angular shape and, further, the shock absorbing member 18 is provided with a mounting plate 24 between the first shock absorbing portion 20 and the second shock absorbing portion 22. The first shock absorbing portion 20 and the second shock absorbing portion 22 have substantially the same outer shape when viewed in a plane, and the mounting plate 24 has a rectangular shape, such that the mounting plate 24 protrudes from the entire peripheries of the first shock absorbing portion 20 and the second shock absorbing portion 22.

Figure 2:
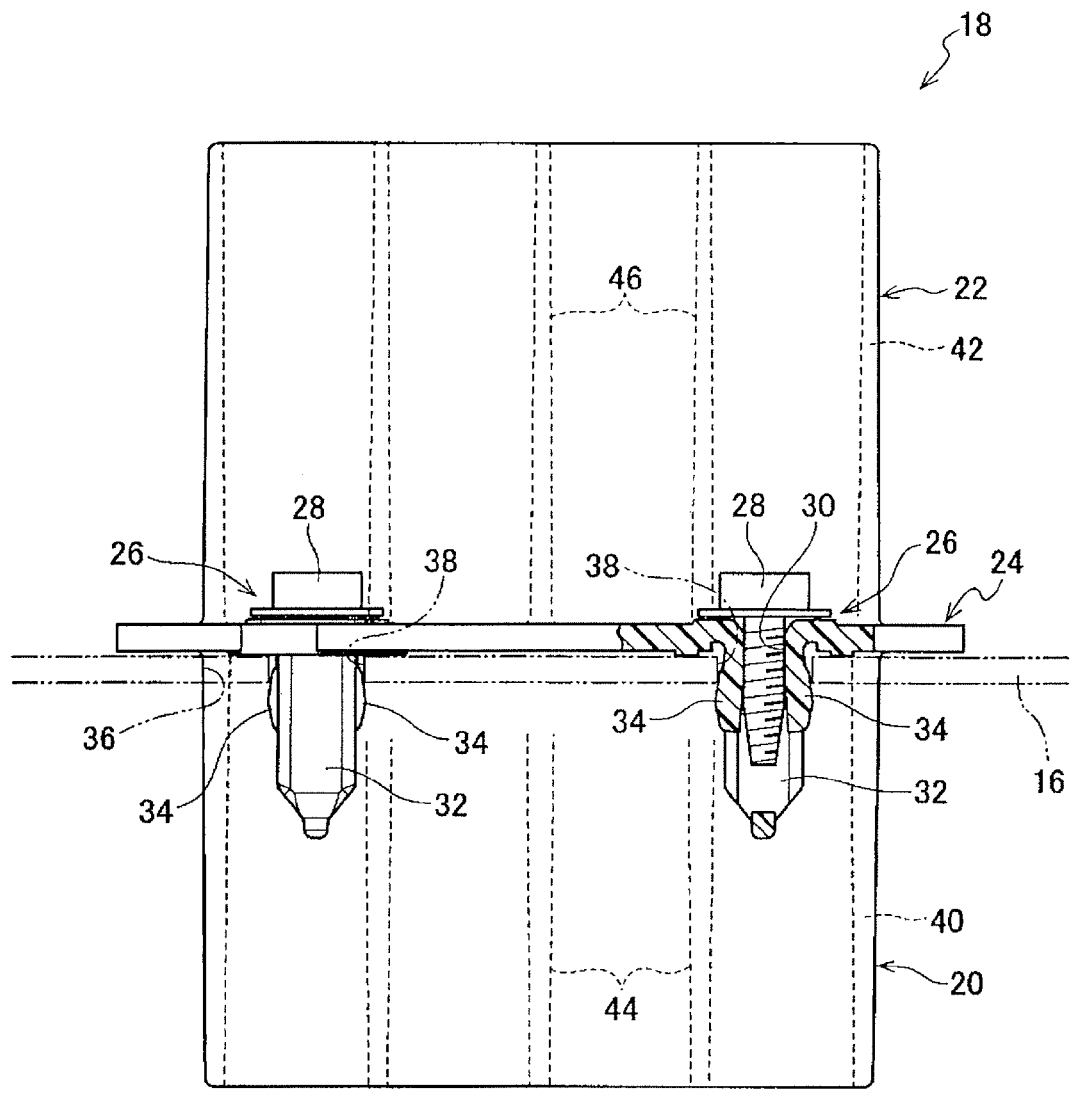
FIG. 2 is a partial cross-sectional view illustrating an engagement portion in the shock absorbing member according to the present embodiment.

The mounting plate 24 is provided with engagement portions 26 at its corner portions. As illustrated in FIG. 2, the engagement portions 26 are provided with hole portions 30 into which tapping screws 28 are screwed. Respective angular-shaped sack portions 32 protruding toward the first shock absorbing portion 20 are communicated with these hole portions 30, wherein the tapping screws 28 are screwed into these angular-shaped sack portions 32.

Near the root portion of each angular-shaped sack portion (near the mounting plate 24), there is provided a pair of engagement pieces 34 which is elastically deformable in a state where they are separated from the angular-shaped sack portion 32. The angular-shaped sack portions 32 and the engagement pieces 34 have widths smaller than the nominal diameter of the tapping screws 28.

On the other hand, the door panel member 16 is provided with a rectangular-shaped mounting hole 36, and the mounting hole 36 is adapted to allow the first shock absorbing portion 20 to be inserted therethrough. The mounting plate 24 is formed to have an outer shape larger than that of the mounting hole 36, so that the mounting plate 24 is in a surface-to-surface contact with a portion of the door panel member 16 which is around the mounting hole 36, in a state where the first shock absorbing portion 20 is inserted in the mounting hole 36.

Further, near the corner portions of the mounting hole 36, there are formed placement holes 38 which are adapted to allow the respective angular-shaped sack portions 32 and the respective engagement pieces 34 to be inserted therein. In a state where the angular-shaped sack portions 32 and the engagement pieces 34 are inserted in the respective placement holes 38, if the respective tapping screws 28 are screwed into the angular-shaped sack portions 32 and the engagement pieces 34, this increases the width of the engagement pieces 34, as the tapping screws 28 are screwed into the angular-shaped sack portions 32. This causes the engagement pieces 34 to engage with portions of the door panel member 16 which are around the placement holes 38, which causes the door panel member 16 to be held and sandwiched between the mounting plate 24 and the engagement pieces 34, thereby preventing the shock absorbing member 18 from being disengaged therefrom. Namely, the shock absorbing member 18 is secured to the door panel member 16.

Figure 3:
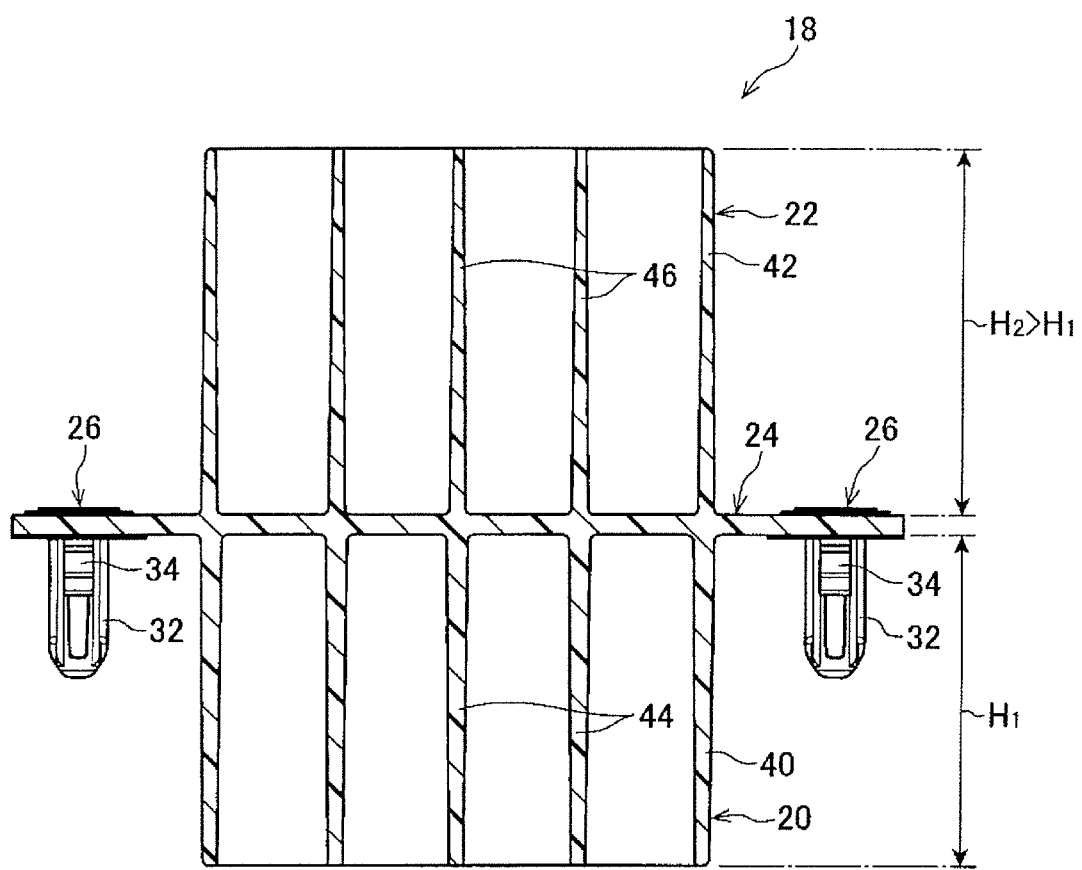
FIG. 3 is a cross-sectional view illustrating the shock absorbing member according to the present embodiment.
Figure 4:
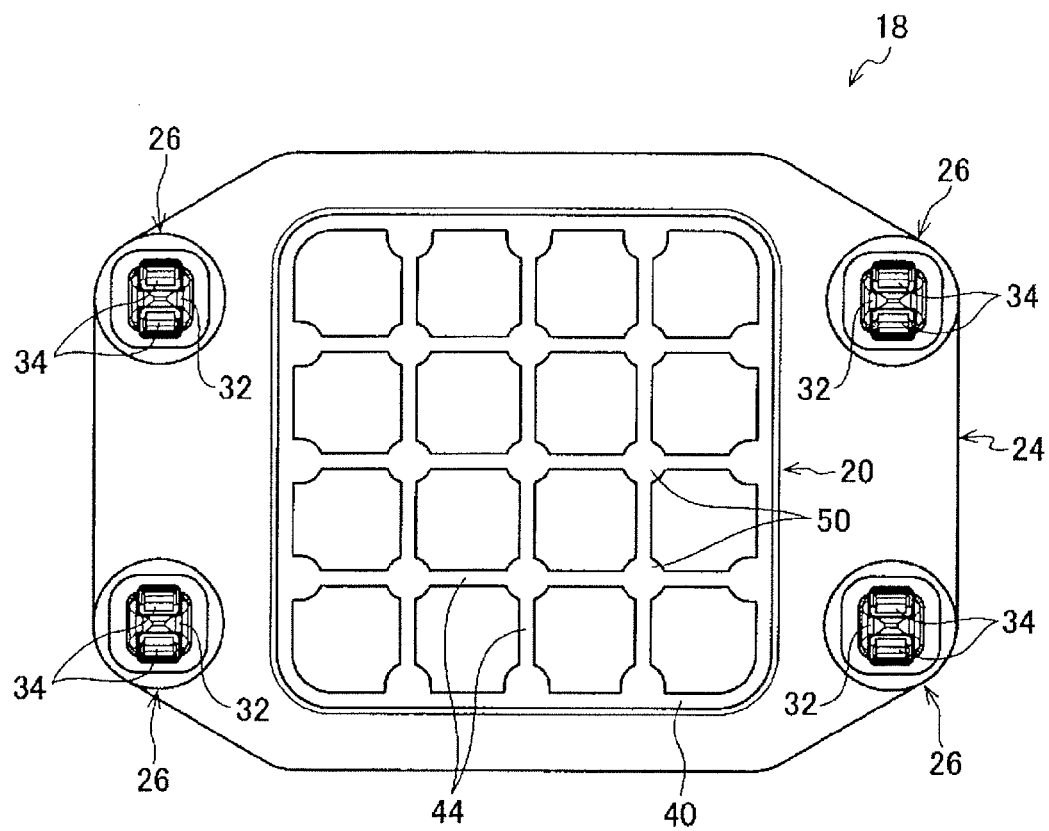
FIG. 4 is a plan view illustrating the shock absorbing member according to the present embodiment, which is viewed from the first shock absorbing portion.

On the other hand, as illustrated in FIG. 1A, FIG. 1B and FIG. 3, the first shock absorbing portion 20 and the second shock absorbing portion have substantially the same outer shape when viewed in a plane, as described above, but the height (H2) of the second shock absorbing portion 22 is made larger than the height (H1) of the first shock absorbing portion 20.

The first shock absorbing portion 20 and the second shock absorbing portion 22 include rectangular-shaped encirclement walls 40 and 42, respectively. As illustrated in FIG. 1B, there is arranged a plurality of ribs 44 in a lattice shape, inside the encirclement wall 40. The ribs 44 are formed to have the same height as that of the encirclement wall 40, and the ribs 44 are aligned at their tip end surfaces with the tip end surface of the encirclement wall 40.

Further, as illustrated in FIG. 1A, there is arranged a plurality of ribs 46 in a lattice shape, inside the encirclement wall 42. The ribs 46 are formed to have the same height as that of the encirclement wall 42, and the ribs 46 are aligned at their tip end surfaces with the tip end surface of the encirclement wall 42.

The number of the ribs 46 provided therein is the same as the number of the ribs 44, and the wall thickness of the ribs 46 is substantially the same as the wall thickness of the ribs 44. However, there is a need for taking account of draft tapers for shaping thereof and, therefore, in some cases, the wall thickness of the ribs 46 may be slightly different from the wall thickness of the ribs 44, depending on the lengths of the ribs.

Further, at the respective intersections of the ribs 46, there are provided column portions 48. In shaping the shock absorbing member 18, when this shock absorbing member 18 is separated from a die (not illustrated) used for shaping the shock absorbing member 18, these column portions 48 receive ejector pins protruding from the die. Therefore, these column portions 48 are formed to have a larger wall thickness than those of the other portions of the ribs 46. Since these column portions 48 are provided at the respective intersections of the ribs 46, the ribs 46 themselves can be reinforced. Therefore, column portions 50 are also provided in the ribs 44, similarly to in the ribs 46.

Further, while there has been described the shock absorbing member 18 having the first shock absorbing portion 20, the second shock absorbing portion and the mounting plate 24 formed by shaping integrally with one another, it is necessary only that the first shock absorbing portion 20, the second shock absorbing portion, and the mounting plate 24 are formed integrally with one another, and therefore, they can also be integrated with one another by welding and the like, after being shaped.

(Effects and Benefits of Shock Absorbing Member)

Hereinafter, effects and benefits of the shock absorbing member 18 will be described.

As illustrated in FIG. 3, in the present embodiment, the height (H2) of the encirclement wall 42 and the ribs 46 in the second shock absorbing portion 22 in the shock absorbing member 18 is made larger than the height (H1) of the encirclement wall 40 and the ribs 44 in the first shock absorbing portion 20 therein. Since the ribs 44 and the ribs 46 have substantially the same wall thickness, and the number of the ribs 44 and the number of the ribs 46 are equal to each other, the second shock absorbing portion 22 is more brittle than the first shock absorbing portion 20, since the second shock absorbing portion 22 is formed to have a larger height than that of the first shock absorbing portion 20.

In other words, the second shock absorbing portion 22 has a higher shock absorbing ability than that of the first shock absorbing portion. Namely, in this case, the first shock absorbing portion 20 and the second shock absorbing portion 22 are made to have different shock absorbing abilities.

Further, as illustrated in FIG. 5A, the first shock absorbing portion 20 is placed in the vehicle inner side, while the second shock absorbing portion 22 is placed in the vehicle outer side, in order to provide, in the vehicle outer side, a higher shock absorbing ability than that in the vehicle inner side. This can alleviate impulsive forces exerted on the vehicle inner side.

By making the ribs 44 and 46 in the first shock absorbing portion 20 and the second shock absorbing portion 22 have different lengths, as described above, it is possible to easily control their shock absorbing abilities. Further, since it is necessary only to make the ribs 44 and 46 in the first shock absorbing portion 20 and the second shock absorbing portion 22 have different lengths, it is possible to realize a lightweighted and inexpensive structure, in comparison with cases of providing an additional shock absorbing member in the second shock absorbing portion 22.

In this case, as illustrated in FIG. 1A and FIG. 1B, the first shock absorbing portion 20 includes the plural ribs 44 erected therein, and further, includes the encirclement wall 40 encircling these plural ribs 44. The encirclement wall 40 is aligned at its tip end surface with the tip end surfaces of the ribs 44. Further, similarly to the first shock absorbing portion 20, the second shock absorbing portion 22 includes the plural ribs 46 erected therein and, further, includes the encirclement wall 42 encircling these plural ribs 46. The encirclement wall 42 is aligned at its tip end surface with the tip end surfaces of the ribs 46.

Further, the plural ribs 44 and the plural ribs 46 are arranged in respective lattice shapes, and the plural ribs 44 and the encirclement wall 40 are coupled to each other, or the plural ribs 46 and the encirclement wall 42 are coupled to each other, so that impulsive forces transmitted to the first shock absorbing portion 20 and the second shock absorbing portion 22 can be received by all the plural ribs 44 and the encirclement wall 40 or by all the plural ribs 46 and the encirclement wall 42, while being dispersed longitudinally and laterally.

For example, although not illustrated, if the first shock absorbing portion 20 does not have a constant height at its end surface, the first shock absorbing portion 20 receives, at a portion thereof, impulsive forces transmitted thereto from the outside, and the impulsive forces are transmitted from the portion of the first shock absorbing portion 20 to the door panel member 16 through the mounting plate 24. Namely, the first shock absorbing portion 20 is caused to have portions which can not absorb impulsive energy, thereby resulting in poor effectiveness.

Figure 5B:
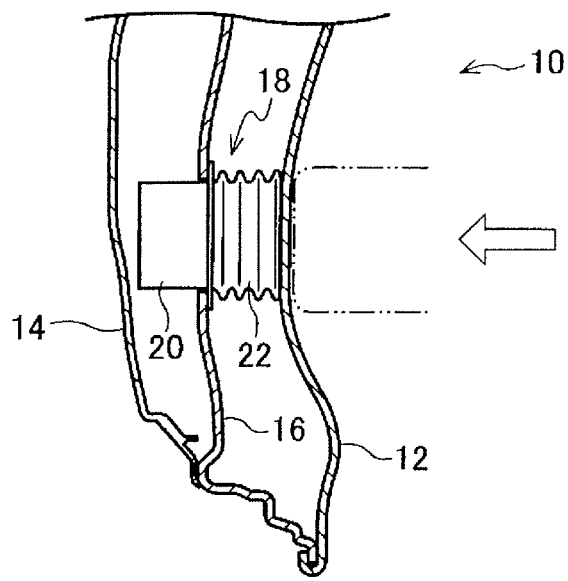
FIG. 5B is a cross-sectional view of the side door in which the shock absorbing member according to the present embodiment is mounted, in a state after the shock absorbing member experiences a shock.

However, as in the present embodiment, the first shock absorbing portion 20 and the second shock absorbing portion 22 are made to have respective constant heights at their end surfaces, as illustrated in FIG. 5B, the first shock absorbing portion 20 can receive, at its entire surface, impulsive forces from the outside (an arrow), and the impulsive energy can be absorbed by deformations of the door panel member 16 and the first shock absorbing portion 20 through the mounting plate 24, thereby resulting in excellent effectiveness.

Further, if the second shock absorbing portion 22 impinges on the inner panel 14 due to the deformation of the door panel member 16, the second shock absorbing portion 22 can receive this impulsive force at its entire surface, and the second shock absorbing portion 22 can absorb the impulsive energy by being deformed thereby. Although not illustrated, a reinforce as a reinforcement bar contacts the shock absorbing member 18. If impulsive energy is absorbed by the shock absorbing member 18, then the remaining impulsive energy is transmitted to this reinforce.

Other Embodiments

Further, while, in the present embodiment, the plural ribs and the plural ribs 46 are arranged in respective lattice shapes, it is not necessary that they are arranged in lattice shapes, since it is necessary only to provide predetermined shock absorbing abilities.

For example, although not illustrated, the plural ribs 44 and the plural ribs 46 can be placed such that they form hexagonal shapes. Further, it is not necessary to couple all the ribs to each other, and each two or more ribs can be coupled to each other, or each two or more ribs can be provided independently. Further, while, in this case, the encirclement walls 40 and 42 are formed to have respective rectangular shapes, they are not necessarily required to have rectangular shapes and can have circular shapes, since they are required only to encircle the ribs 44 and 46.

Figure 7:
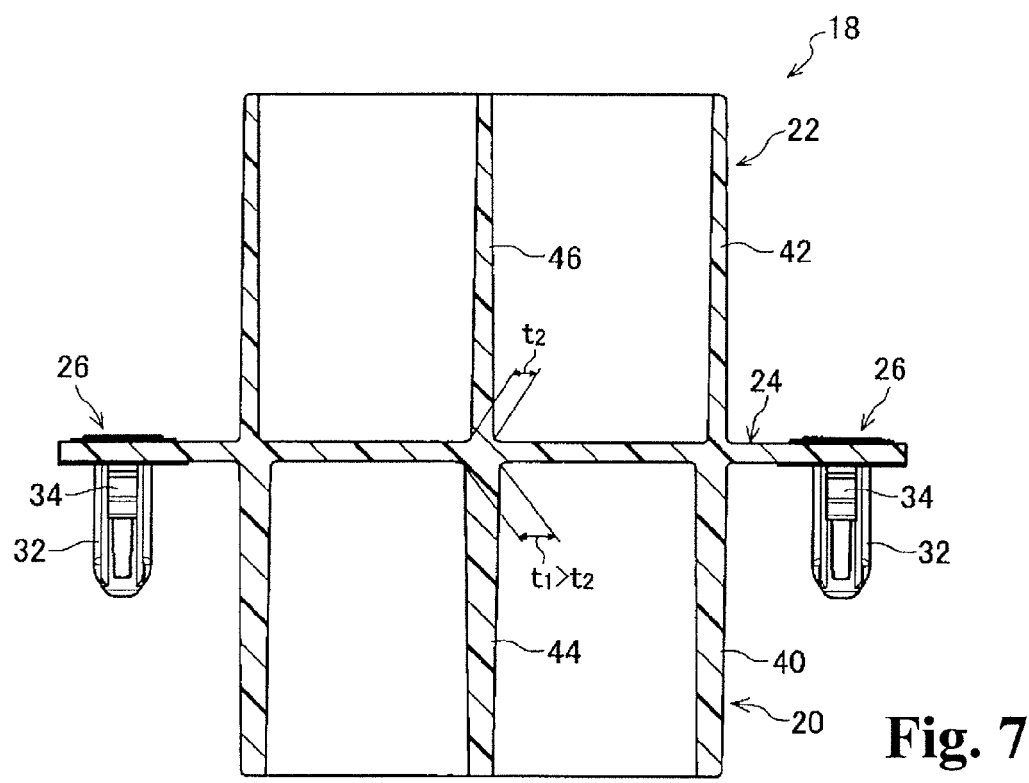
FIG. 7 is a cross-sectional view illustrating a first modification example of the shock absorbing member according to the present embodiment.

Further, in this case, as illustrated in FIG. 3, the ribs 46 in the second shock absorbing portion 22 are formed to have a height (H2) larger than the height (H1) of the ribs 44 in the first shock absorbing portion 20, in order to make the ribs 46 have a strength lower than that of the ribs 44 to make the second shock absorbing portion 22 have a higher shock absorbing ability than that of the first shock absorbing portion 20. However, alternatively, as illustrated in FIG. 7, the wall thickness (t2) of the ribs 46 can be made smaller than the wall thickness (t1) of the ribs 44, in order to make the ribs 46 have a strength lower than that of the ribs 44 for making the second shock absorbing portion 22 have a higher shock absorbing ability than that of the first shock absorbing portion 20.

Figure 8:
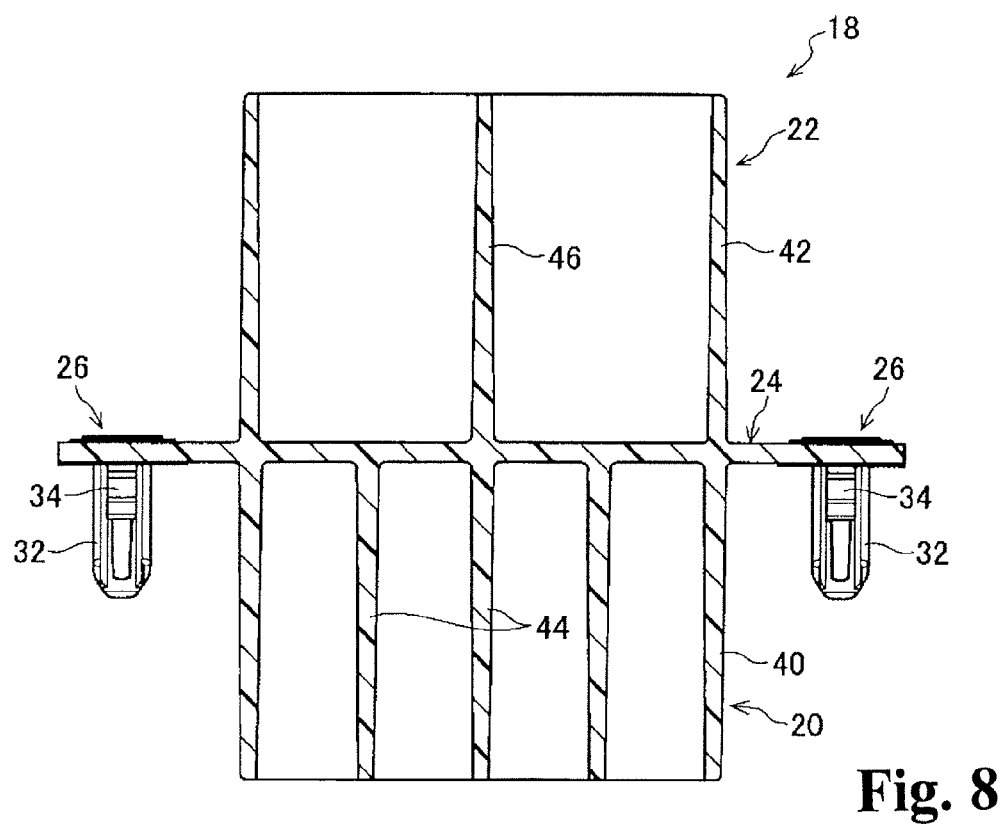
FIG. 8 is a cross-sectional view illustrating a second modification example of the shock absorbing member according to the present embodiment.

Also, as illustrated in FIG. 8, the number of the ribs 46 can be made smaller than the number of the ribs 44, in order to make the ribs 46 have a lower strength than that of the ribs 44, for making the second shock absorbing portion 22 have a higher shock absorbing ability than that of the first shock absorbing portion 20. Also, these structures can be combined.

Figure 9:
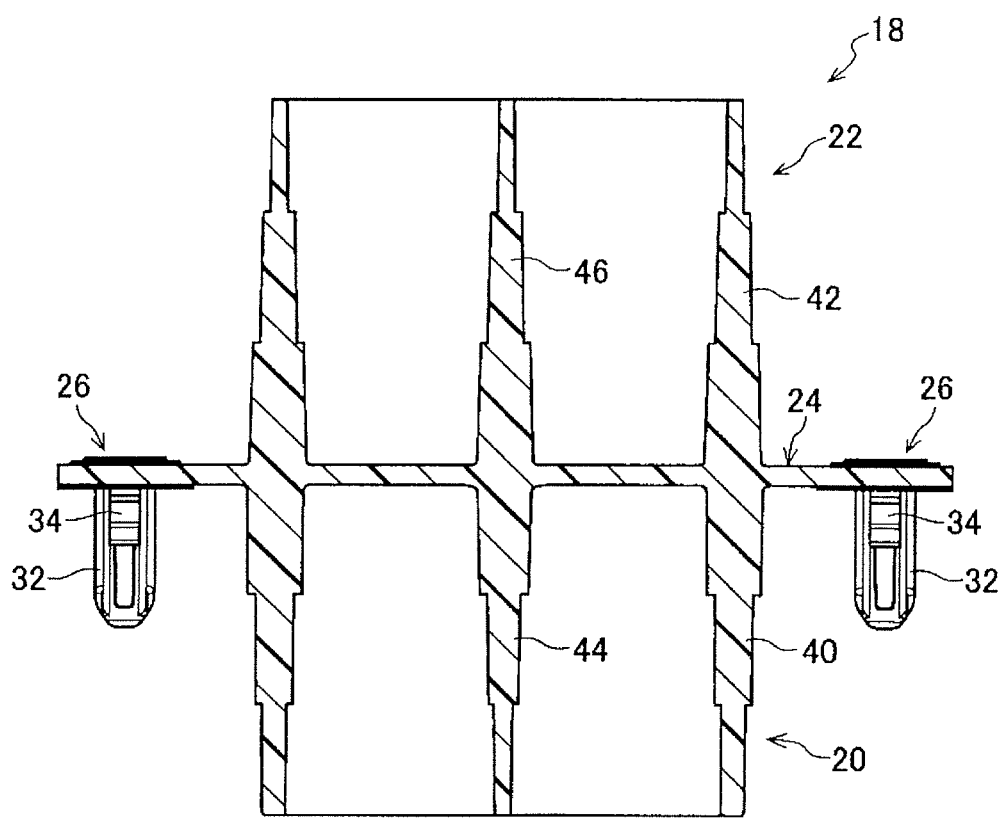
FIG. 9 is a cross-sectional view illustrating a third modification example of the shock absorbing member according to the present embodiment.

Further, the encirclement walls 40 and 42 and the ribs 44 and 46 are provided with draft tapers, and the encirclement walls 40 and 42 and the ribs 44 and 46 have widths gradually increasing from their tip end portions to their root portions, so that the encirclement walls 40 and 42 and the ribs 44 and 46 have shock absorbing abilities gradually increasing from their tip end portions to their root portions. Accordingly, as illustrated in FIG. 9, the encirclement walls 40 and 42 and the ribs 44 and 46 can be formed to have stepwise wall thicknesses, in order to vary their shock absorbing abilities in a stepwise manner. This enables controlling their shock absorbing abilities in a stepwise manner.

What is claimed is:

1. A shock absorbing member adapted to be mounted in a door panel member for absorbing shocks from outside of a vehicle, the shock absorbing member comprising:

a mounting plate adapted to be mounted in the door panel member, including an inner side portion and an outer side portion outside the inner side portion;

a first shock absorbing portion provided on one surface of the inner side portion of the mounting plate to be positioned in a vehicle inner side of the door panel member; and a second shock absorbing portion provided on another surface of the inner side portion of the mounting plate to be positioned in a vehicle outer side of the door panel member, said second shock absorbing portion having a higher shock absorbing ability than the first shock absorbing portion and being disposed on a side opposite to the first shock absorbing portion relative to the mounting plate so that the inner side portion of the mounting plate is sandwiched between the first shock absorbing portion and the second absorbing portion;

wherein the first shock absorbing portion includes a plurality of first ribs with a same height erected from the inner side portion of the mounting plate to form openings opening outwardly, and a first encirclement wall erected from the inner side portion of the mounting plate and encircling the plurality of first ribs, said first encirclement wall having the height same as that of the plurality of first ribs, the second shock absorbing portion includes a plurality of second ribs with a same height erected from the inner side portion of the mounting plate to form openings opening outwardly, and a second encirclement wall erected from the inner side portion of the mounting plate and encircling the plurality of second ribs, said second encirclement wall having the height same as that of the plurality of second ribs, and the mounting plate includes engagement portions formed on the outer side portion thereof, each having a sack portion protruding along the first shock absorbing portion and a pair of engagement formed at a root portion of the sack portion and protruding along the first shock absorbing portion separately from the sack portion.

2. A shock absorbing member according to claim 1, wherein the plurality of first ribs and the plurality of second ribs are arranged in lattice shapes, respectively.

3. A shock absorbing member according to claim 1, wherein the plurality of second ribs is formed longer than the first ribs.

4. A shock absorbing member according to claim 1, wherein the plurality of second ribs is formed to have a smaller wall thickness than the plurality of first ribs.

5. A shock absorbing member according to claim 1, wherein a number of the plurality of second ribs is less than a number of the plurality of first ribs.

6. A shock absorbing member according to claim 1, wherein at least one of the plurality of first ribs and the plurality of second ribs has a wall thickness varying stepwisely or continuously in a direction from a tip end portion to the root portion thereof.

7. A shock absorbing structure for absorbing shocks from outside of a vehicle, comprising:

a door panel member having a mounting hole; and the shock absorbing member according to claim 1, wherein the first shock absorbing portion is inserted in the mounting hole formed in the door panel member from the vehicle outer side and placed in the vehicle inner side with respect to the door panel member, the second shock absorbing portion is placed in the vehicle outer side with respect to the door panel member, and the mounting plate is mounted to a portion of the door panel member around the mounting hole.

8. A shock absorbing member according to claim 1, wherein the plurality of first ribs is arranged in a lattice shape inside the first encirclement wall, and the plurality of second ribs is arranged in a lattice shape inside the second encirclement wall; and the first shock absorbing portion further comprises first column portions, each having a thickness thicker than that of the plurality of the first ribs, formed at intersections of the plurality of the first ribs, respectively, and the second shock absorbing portion further comprises second column portions, each having a thickness thicker than that of the plurality of the second ribs, formed at intersections of the plurality of second ribs, respectively.

9. A shock absorbing member according to claim 1, wherein the inner side portion of the mounting plate is solid without a hole.

10. A shock absorbing member according to claim 1, wherein the sack portion includes two portions connecting each other at a tip end portion thereof.

* * * * *